(12) United States Patent
Rubin et al.

(10) Patent No.: US 11,687,300 B2
(45) Date of Patent: Jun. 27, 2023

(54) SYSTEMS AND METHODS FOR CREATING CUSTOMIZED PRINT OR ELECTRONIC MATERIALS

(71) Applicant: Rensera LLC, Dallas, TX (US)

(72) Inventors: Rochelle Rubin, Dallas, TX (US); Tim Eng, Jersey City, NJ (US)

(73) Assignee: Rensera LLC, Dallas, TX (US)

( * ) Notice: Subject to any disclaimer, the term of this patent is extended or adjusted under 35 U.S.C. 154(b) by 0 days.

(21) Appl. No.: 17/654,955

(22) Filed: Mar. 15, 2022

(65) Prior Publication Data

US 2022/0291882 A1    Sep. 15, 2022

Related U.S. Application Data

(60) Provisional application No. 63/161,090, filed on Mar. 15, 2021.

(51) Int. Cl.
*G06F 3/12* (2006.01)

(52) U.S. Cl.
CPC .......... *G06F 3/1243* (2013.01); *G06F 3/1204* (2013.01); *G06F 3/1206* (2013.01); *G06F 3/1275* (2013.01)

(58) Field of Classification Search
CPC .... G06F 3/1243; G06F 3/1204; G06F 3/1206; G06F 3/1275
USPC ...................................................... 358/1.15
See application file for complete search history.

(56) References Cited

U.S. PATENT DOCUMENTS

| | | | |
|---|---|---|---|
| 8,040,548 B1* | 10/2011 | Siegel | G06Q 40/03 358/1.15 |
| 2012/0243029 A1* | 9/2012 | St. Jacques, Jr. | G06F 3/1204 358/1.15 |
| 2014/0108188 A1* | 4/2014 | Comstock | G06F 3/1272 705/26.5 |

* cited by examiner

*Primary Examiner* — Allen H Nguyen
(74) *Attorney, Agent, or Firm* — Haynes and Boone, LLP

(57) ABSTRACT

Methods, systems, and software are disclosed for a create-to-print document solution. A main processor generates individualized bespoke print material by receiving transmitted customizable third-party data and user input data, comprising, at least in part, project metadata. The third party data and user input data are integrated at the processor to create a plurality of customizable user templates and content.

20 Claims, 16 Drawing Sheets

SYSTEMS AND METHODS FOR CREATING CUSTOMIZED PRINT OR ELECTRONIC MATERIALS

CROSS REFERENCE TO RELATED APPLICATIONS

This application claims the benefit of U.S. Provisional Patent Application No. 63/161,090, filed on Mar. 15, 2021, which is incorporated herein by reference for all purposes.

FIELD

The present disclosure relates to systems and methods of creating custom bespoke print or electronic materials, and more particularly to creating high quality and commercial print or electronic quality materials with design software.

BACKGROUND OF THE INVENTION

In general, marketing materials, such as informal pitch documents and formal proposals, are frequently used for business development in a plurality of industries. Such materials are difficult to differentiate based solely on content and the layouts tend to look generic and basic because they are usually generated using Microsoft® Word® or PowerPoint®. On the other hand, highly designed, customized, bespoke materials require significant time and effort from graphic designers and marketing communication specialists, and in some cases, require the retention of external resources.

It is with respect to the above issues and other problems presently faced by those of skill in the pertinent art that the embodiments presented herein were contemplated. Embodiments provided herein solve the problems associated with the prior art and provide a system and method for the professional services industry to develop the capability to create dynamic, bespoke print and electronic materials that are also refined in look and feel without the involvement of a graphic designer. Other advantages and benefits will become apparent after reviewing the present disclosure.

SUMMARY OF THE INVENTION

Accordingly, the present disclosure relates to systems and methods that overcome the problems identified above. While several advantages of the system and method of one embodiment are provided in this section, this Summary is neither intended nor should it be construed as being representative of the full extent and scope of embodiments of the present invention. Embodiments of the present invention are set forth in various levels of detail in the Summary as well as in the attached drawings and in the Detailed Description, and no limitation as to the scope of this disclosure is intended by either the inclusion or non-inclusion of elements, components, etc. in the Summary. Additional aspects of the present disclosure will become more readily apparent from the materials included in the Detailed Description and Claims below.

In view of these shortcomings in the prior art, embodiments of the present invention solve the problems associated with the prior art. More specifically, embodiments of the present invention relate to systems and methods of highly customizable, bespoke document creation, involving various software applications. The software, systems and methods allow for generally automating document assembly, design, formatting, and generation. The software, systems and methods also allow users to design and produce high quality, customized marketing materials on an ad hoc basis using a web to print platform.

In some preferred embodiments, the systems and methods include a sophisticated web application that creates a seamless experience for assimilating content from disparate systems to generating final production-ready files without the need for graphic design services. In these embodiments, the software and systems include automated workflow for ease of use and to ensure content consistency and quality control. As such, the systems disclose a novel way to give users the ability to easily create superior marketing collateral on an as needed basis.

Embodiments of the present disclosure also disclose a method for creating individualized bespoke print or electronic materials. In some preferred embodiments, a user is directed to the dashboard to create a new project. The dashboard displays the list of all projects related to the user's team. The user can filter the list of projects based on various criteria. The user can then enter metadata about the project such as document name, requestor, and other information that is used to tag the project for future searching and reporting. Some metadata is automatically recorded by the system. The user is also able to capture additional details about the project, as needed, in a free text field. The user also selects the desired template for the project during this first step. Users may have a virtually unlimited number of templates in the system.

A user then can compose the project by selecting various pieces of content from the tree in the content panel to populate each section of the document. The content is filtered based on which section of the template the user is populating. The user drags and drops the desired content from the panel/tree into the appropriate section of the document. Once all desired content has been chosen, the user can then review the list of chosen content and change the order of the content, if needed. When ready, the user clicks on Generate Project, which then launches the document in the Project Editor, where the user may further customize the document.

Once a project is launched in the Project Editor, the user is able to make changes to the content, images, layout, etc. Within the Project Editor, the user may also add notes intended for the reviewer/approver to see. A user may also import content by using the content panel in the Project Editor and drag and drop the content to the text boxes.

Once all edits have been made and all notes added, the user clicks Send for Approval. The system will then generate a unique URL for the document that can then be emailed to the approver(s). When an approver clicks on the project link, the document is launched in the Approver Project Editor. Once the approver has reviewed and edited the document, he/she may Approve the document or click Submit to send the document back to the marketing user. Either action generates an automatic notification email that is sent to the marketing user. The marketing user is then able to relaunch the document in the Project Editor to view the approver's changes, see and respond to notes entered by the approver and make final changes, as needed.

The Summary is neither intended nor should it be construed as being representative of the full extent and scope of the present disclosure. The present disclosure is set forth in various levels of detail in the Summary, as well as in the attached drawings and the Detailed Description, and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings. The above-described benefits, embodiments, and/or characterizations are not necessarily complete or exhaustive, and in particular, as to the patentable subject matter disclosed herein. Other benefits, embodiments, and/or characterizations of the present disclosure are possible, alone or in combination, as set forth above and/or described in the accompanying figures and/or in the description herein below. Further details and other features will become apparent after review of the following Detailed Description and accompanying drawing figures.

While the invention is described in terms of exemplary embodiments, it should be appreciated that individual aspects of the invention may be separately claimed.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts.

The accompanying drawings, which are incorporated in and constitute a part of the specification, illustrate embodiments of the disclosure and together with the general description of the disclosure given above and the detailed description of the drawings, given below, serve to explain the principles of the disclosure.

In the drawings:

FIG. 1 is a flow diagram of a method for creating and printing a document, according to an embodiment.

FIGS. 2A through 2P illustrate user interfaces for creating a document, according to an embodiment.

FIG. 3 illustrates an example database, according to an embodiment.

FIG. 4 is a computing environment, according to an embodiment.

Figure 5:
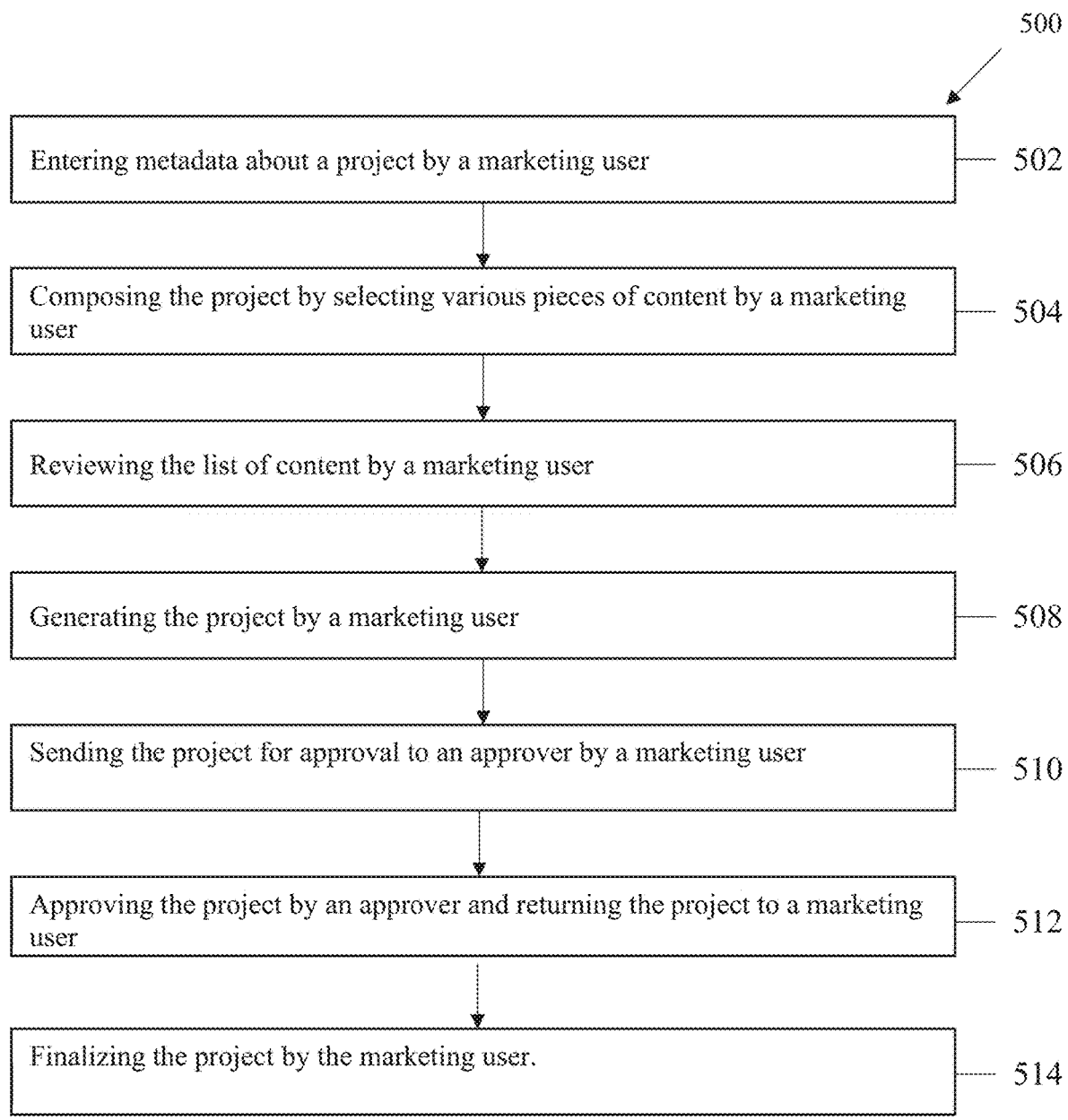

FIG. 5 describes a method for creating and printing a document, according to a preferred embodiment.

In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Embodiments of the present invention provide benefits across a broad spectrum of endeavors. It is applicants' intent that this specification appended hereto be accorded a breadth in keeping with the scope and spirit of the invention being disclosed despite what might appear to be limiting language imposed by the requirements of referring to the specific examples disclosed. Thus, to acquaint persons skilled in the pertinent arts most closely related to the present invention, a preferred embodiment of the system is disclosed for the purpose of illustrating the nature of the invention. The exemplary methods of installing, assembling and operating the system are described in detail according to the preferred embodiment, without attempting to describe all of the various forms and modifications in which the invention might be embodied. As such, the embodiments described herein are illustrative, and as will become apparent to those skilled in the art, can be modified in numerous ways within the scope and spirit of the invention, the invention being measured by the appended claims and not by the details of the specification.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, subparagraph (f).

Referring now to the drawings, FIGS. 1-5 depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments and variations of the invention. As a result, the invention is not limited to the specific embodiments described below, but only by the claims and their equivalents.

Embodiments of the invention describe a system 100 for creating individual bespoke material 118 comprising a main processor 102 configured to receive transmitted server output data 106 from a main server 104. The server output data 106 comprises customizable third-party data, such as, for example, data built on the Adobe® InDesign CC Server platform. Main processor 104 also receives user input data 108, where the user input data 108 comprises, at least in part, project metadata. In some preferred embodiments, the main processor then integrates the server output data 106 and user input data 108. Accordingly, the customizable third-party data and project metadata are used, at least in part, to create project template data 110. The project template data 110 is then customized to create populated content data 112, wherein the populated content data 112 comprises one or more pieces of content 114. The populated content data 112 is then filtered, at least in part, to create filtered populated content data 116, wherein the filtered populated content data 116 is created, at least in part, based on which section of the template a user is populating. Individualized bespoke print or electronic material 118 is then created, at least in part, from the filtered populated content data 116.

In some preferred embodiments, the server output data 106 is built on the Adobe® InDesign CC Server platform. This allows the system 100 to tap into all the functionality of Adobe® InDesign while being able to customize the user interface of the main processor 102. As such, the system's user interface is simplified and easier to use over the standard Adobe® InDesign user interface. The system 100 also strips out unnecessary and complicated functionality from Adobe® InDesign and thereby allows non-design users to create professionally designed pitch and proposal documents without needing to know or use the Adobe® InDesign desktop publishing software while still tapping into the superior rendering capabilities of Adobe® InDesign. Adobe® InDesign CC Server software delivers a robust and scalable engine that leverages the design, layout, and typographical capabilities of InDesign CC to let the user programmatically create engaging automated documents and/or individualized bespoke print or electronic material 118.

In these preferred embodiments, wherein the system 100 is based on the Adobe® InDesign CC Server platform, the system 100 is able to generate hi-resolution print ready PDFs for either single page printing or for printing as a saddle-stitched booklet using the "print booklet" and "print" functionality that are built into the Adobe® InDesign CC Server platform. The system is able to templatize anything that is currently designed using InDesign or another similar page layout tool typically done by graphic designers. In addition to proposal, pitch and tender documents, users are able to generate other marketing content such as: Advertisements, Brochures, Flyers, One-sheets, Posters, Signage, etc. In some preferred embodiments, the system can also be set up to customize tools within the system that enforce compliance with a company or firm's brand standards. The system can also be customized to meet a client's visual identity requirements. For example, the system will be able to limit font and color choices based on the client's visual identity standards ensuring consistency through the organization. In some preferred embodiments, the system also is able to integrate with third party digital asset management (DAM) systems that would house a library of standard images of an organization. Further, the system is able to integrate with a client's preferred or existing digital asset management (DAM) system so that only approved images may be selected by the system users. In these embodiments, the system can integrate with any existing image library so that the available image options are limited to those that comply with the client's brand standards and are images for which the client has the right to use in its marketing materials.

Preferred embodiments of the current invention allow users to create branded templates and populate those templates with chosen content that can be derived from multiple sources, such as, but not limited to, content management systems or document management systems. The template changes dynamically as content is chosen allowing users to preview a "blueprint" of the pitch document as they are guided through the generation process.

Further, preferred embodiments of the current invention provide alternative layout options for designated sections of the template, further permitting marketing professionals to design each section to maximize the visual impact of the content. The invention also integrates with digital asset management (DAM) systems allowing users easy access to assets such as images and logos using drag and drop functionality. The user interface maintains an intuitive design and provides for customized views and functionality depending on the user group.

In some embodiments, the user experience is straightforward requiring minimal training for the marketing users or project requesters. The system also incorporates automated workflow that guides users throughout the entire life cycle of a project, from the initial document development, through the editing process with the project requester, to the approval, rendering and eventual archiving of the final product.

In some preferred embodiments, the system 100 captures user input data 108 comprising metadata elements that can be used to search, filter and report on projects. Users are given access to customizable metadata fields that allow system adaption and individualized project tracking (e.g., geographic locations, service areas, etc.). Further, the system 100 in these preferred embodiments has a reporting function that allows system administrators to analyze statistics on the number and type of projects as well as team and user data.

The present disclosure further provides system components that can be tailored to each user's needs. The system's administration functionality, ability to pull content from multiple sources, and capacity to have a virtually unlimited number of branded templates, allow clients to customize their solution, which is a significant improvement over the prior art.

As such, preferred embodiments of the present disclosure can be used to completely replace existing competitor proposal generator systems. In the alternative, the present system 100 may be implemented to supplement such systems when more highly designed pieces of marketing collateral are needed. In some preferred embodiments, the system utilizes a third-party web to print service that connects the Adobe InDesign Server with standard web browsers. In these embodiments, the third-party web to print service also serves as the user interface of the system for the Editor function. The system also incorporates another third-party system that allows the system to track and record notes and comments. Further, the present system offers users the benefit of crafting individualized bespoke marketing documents 118 without having to rely on (internal or external) graphic design resources. This, in turn, eliminates the need to introduce a third party into the exchange between the marketer and the requestor, which reduces the back and forth among multiple parties, decreasing the time and cost needed to produce the desired document. The present system 100 also offers a competitive advantage for users that do not have a dedicated design team, giving them virtually the same capabilities to develop such highly designed collateral.

In preferred embodiments, the system is backend agnostic which allows the system to integrate with a client's preferred or existing content management system(s) to store its marketing content. In these embodiments, the system also integrates with an existing proposal generator system—the latter acting as the content storage piece and the system functioning as the output generator. This functionality is especially advantageous to clients who have all their content stored in an existing system, but that system is only capable of basic output deliverables in Microsoft Word® or Power-Point®, which are inherently limited in their ability to be customized as those tools were never intended to be used for graphic design purposes. The present system also possesses its own content management component. Therefore, users have the option to store content directly in the system. The system in some preferred embodiments also function as a standalone tool. In other embodiments, the system works in conjunction with another pitch generating tool to provide clients with the flexibility to generate highly designed marketing collateral without the need to maintain the content in multiple places.

Figure 1:
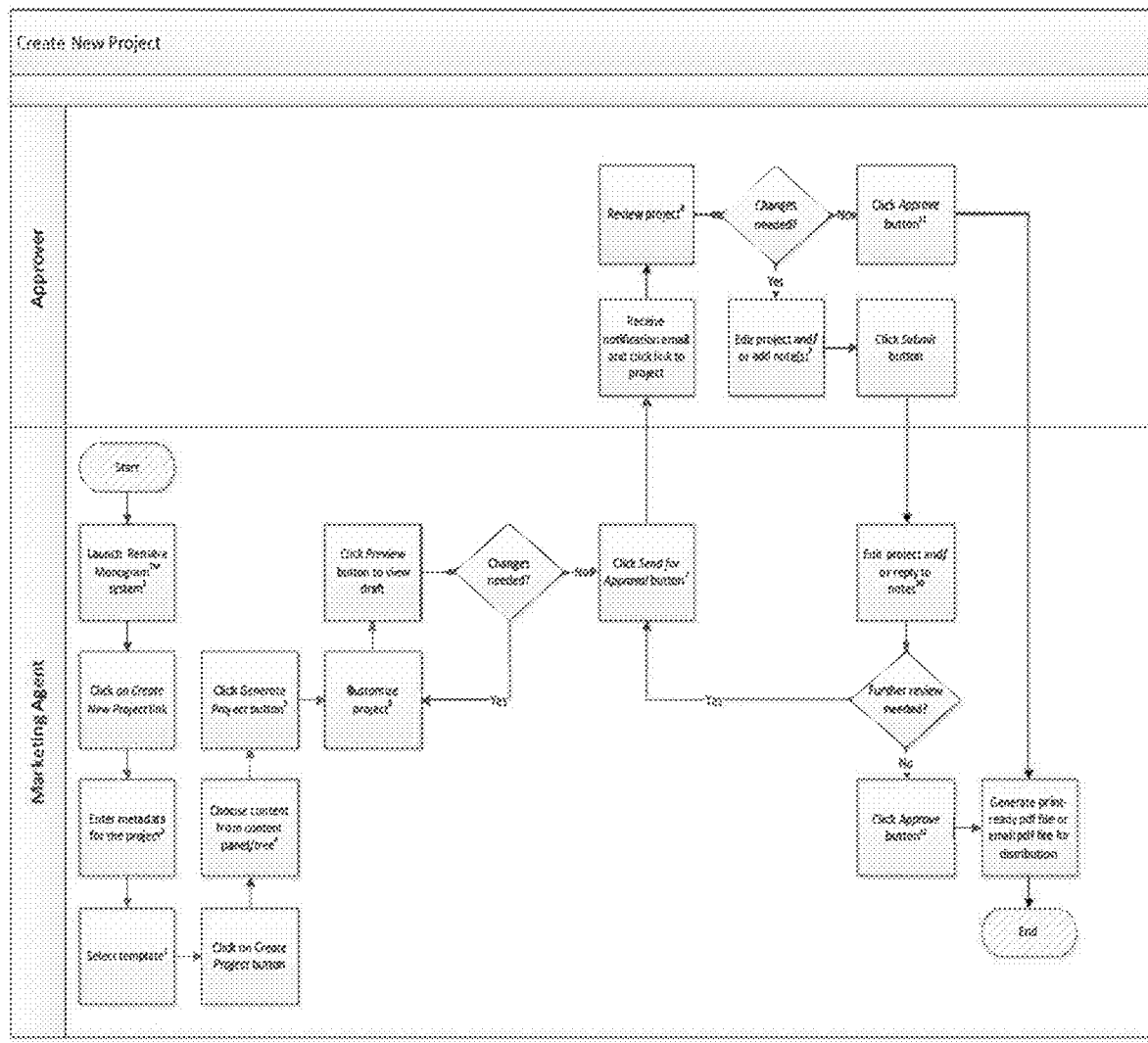
Figure 2A:
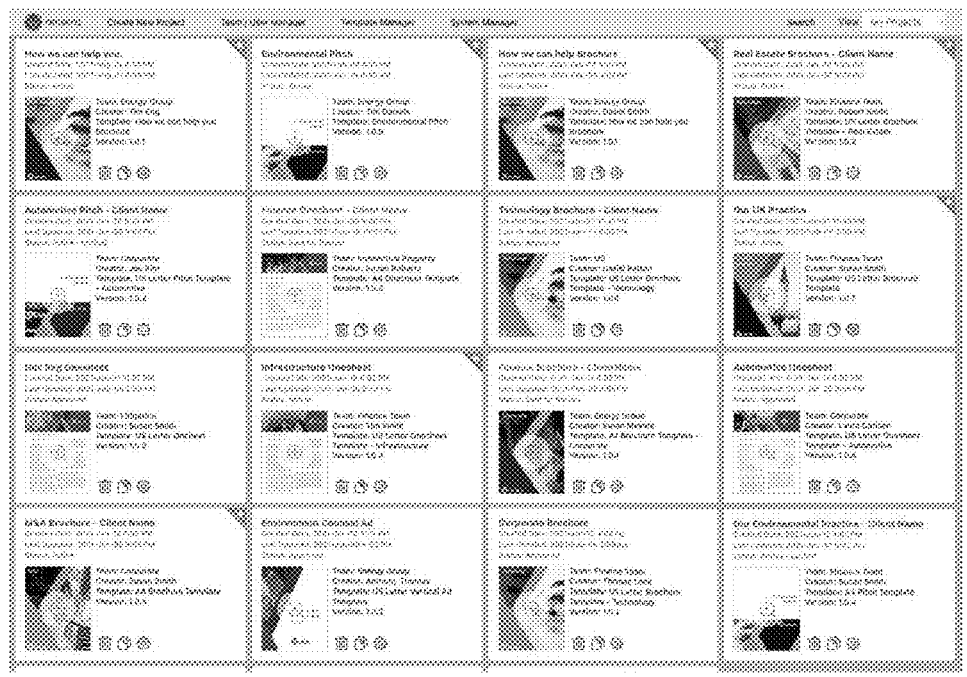
Figure 2B:
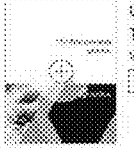
Figure 2C:
Figure 2D:
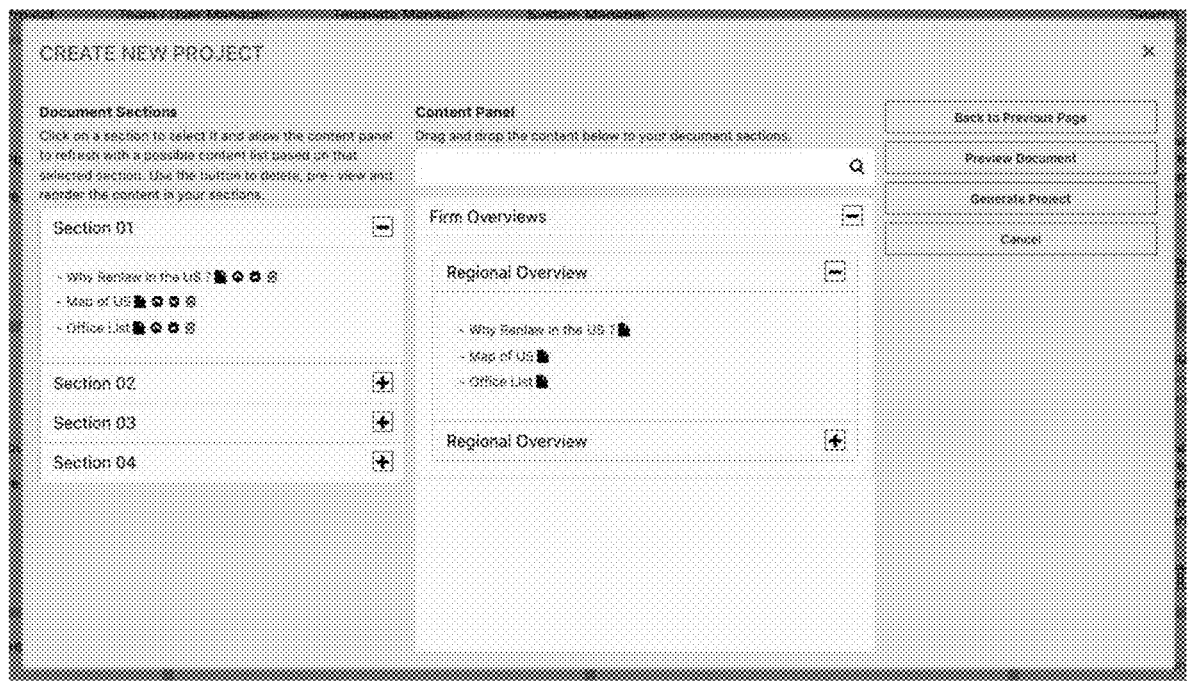
Figure 2E:
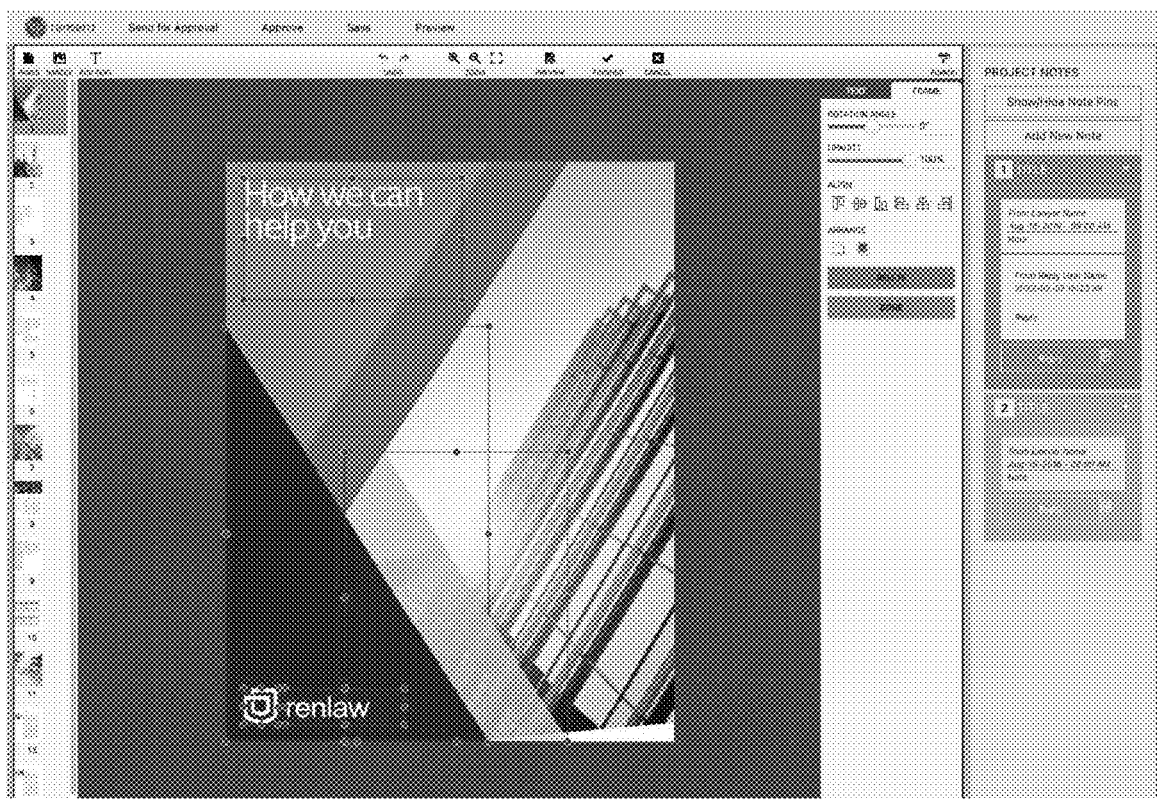
Figure 2F:
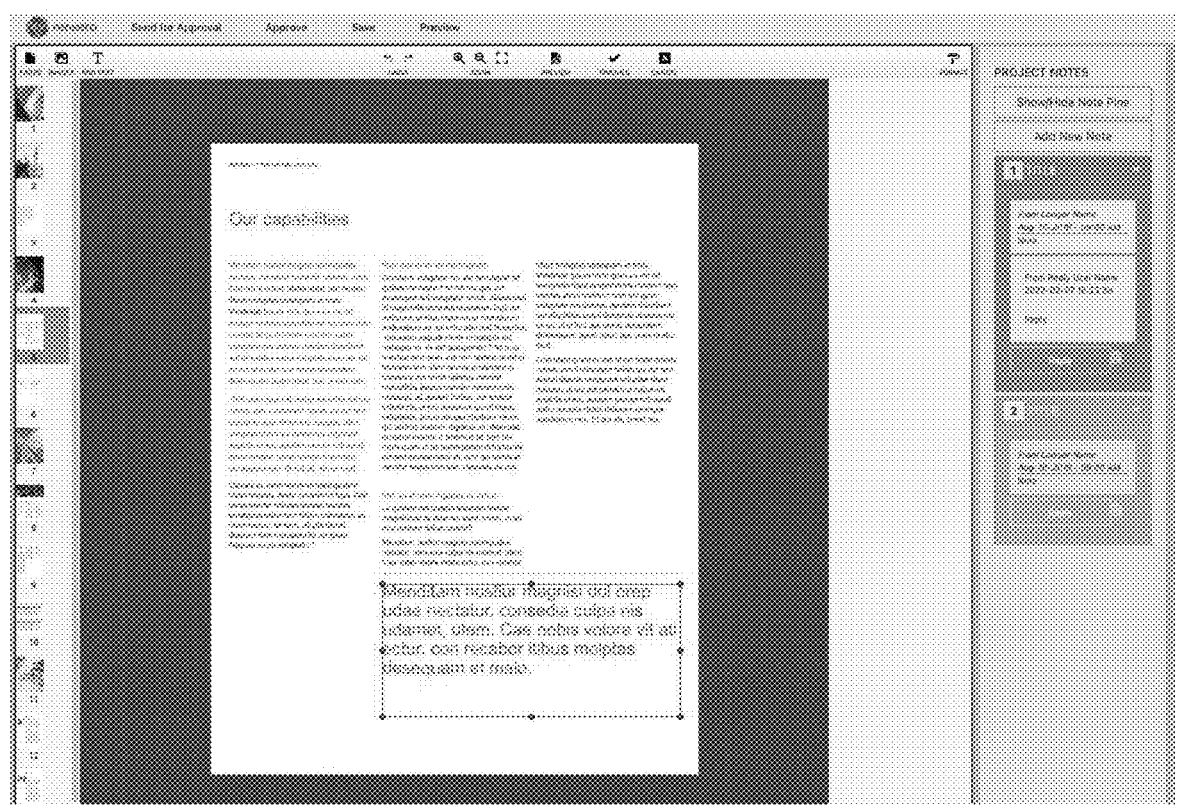
Figure 2G:
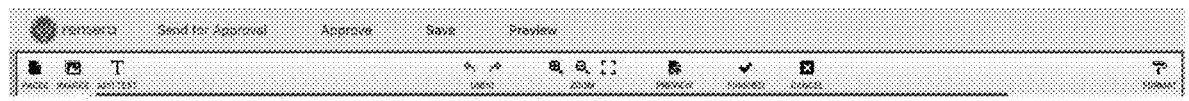
Figure 2H:
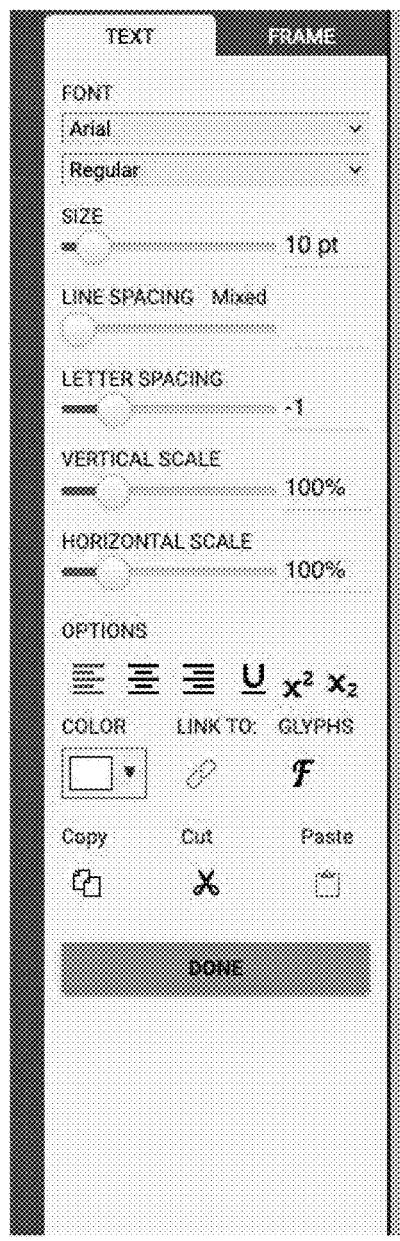
Figure 2I:
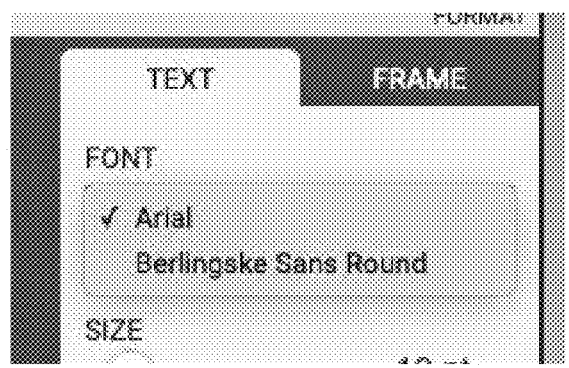
Figure 2J:
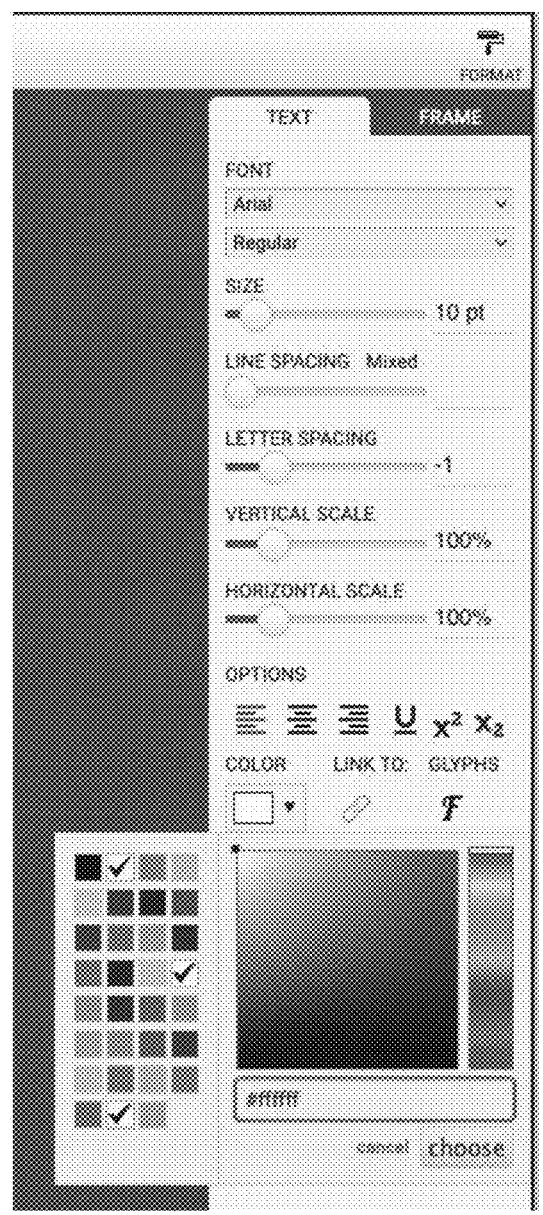
Figure 2K:
Figure 2L:
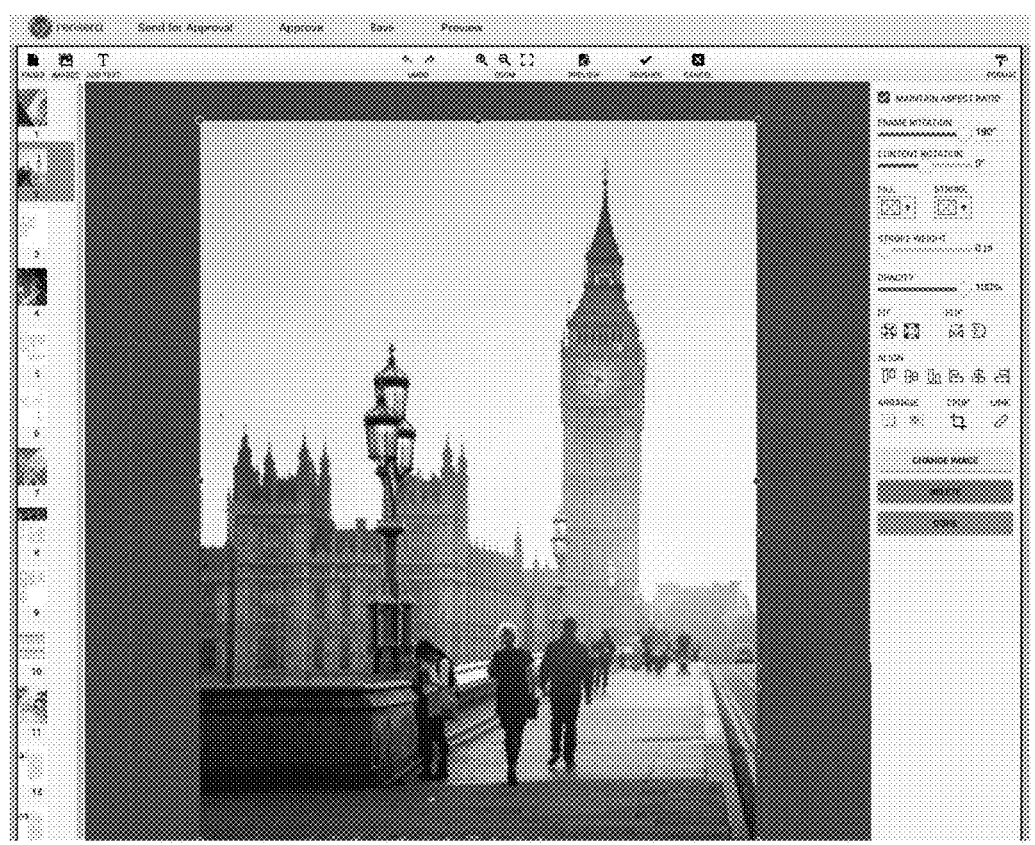
Figure 2M:
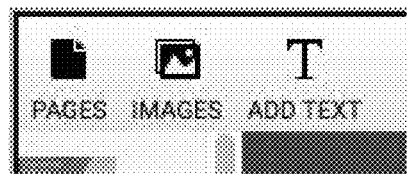
Figure 2N:
Figure 2O:
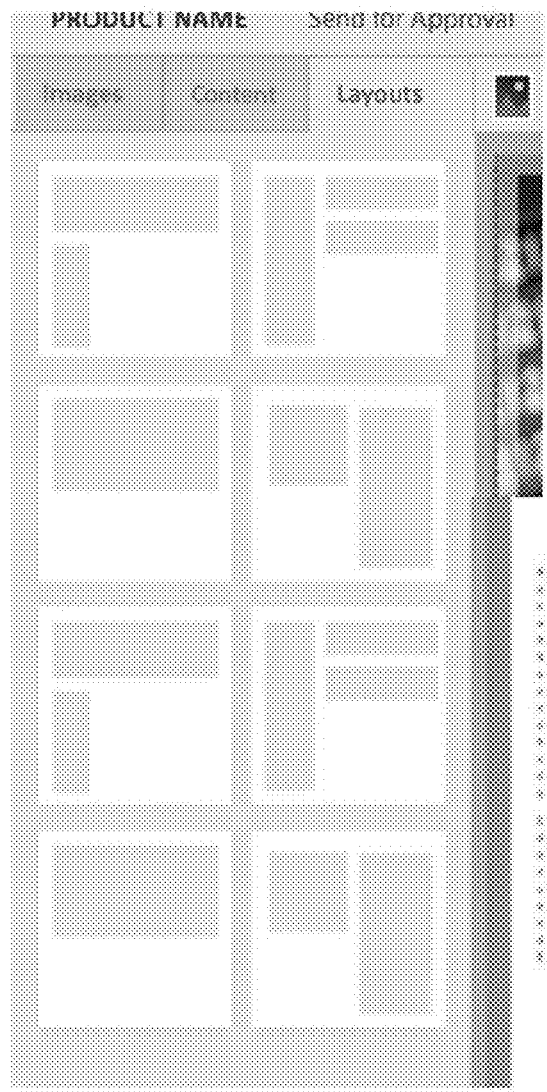
Figure 2P:
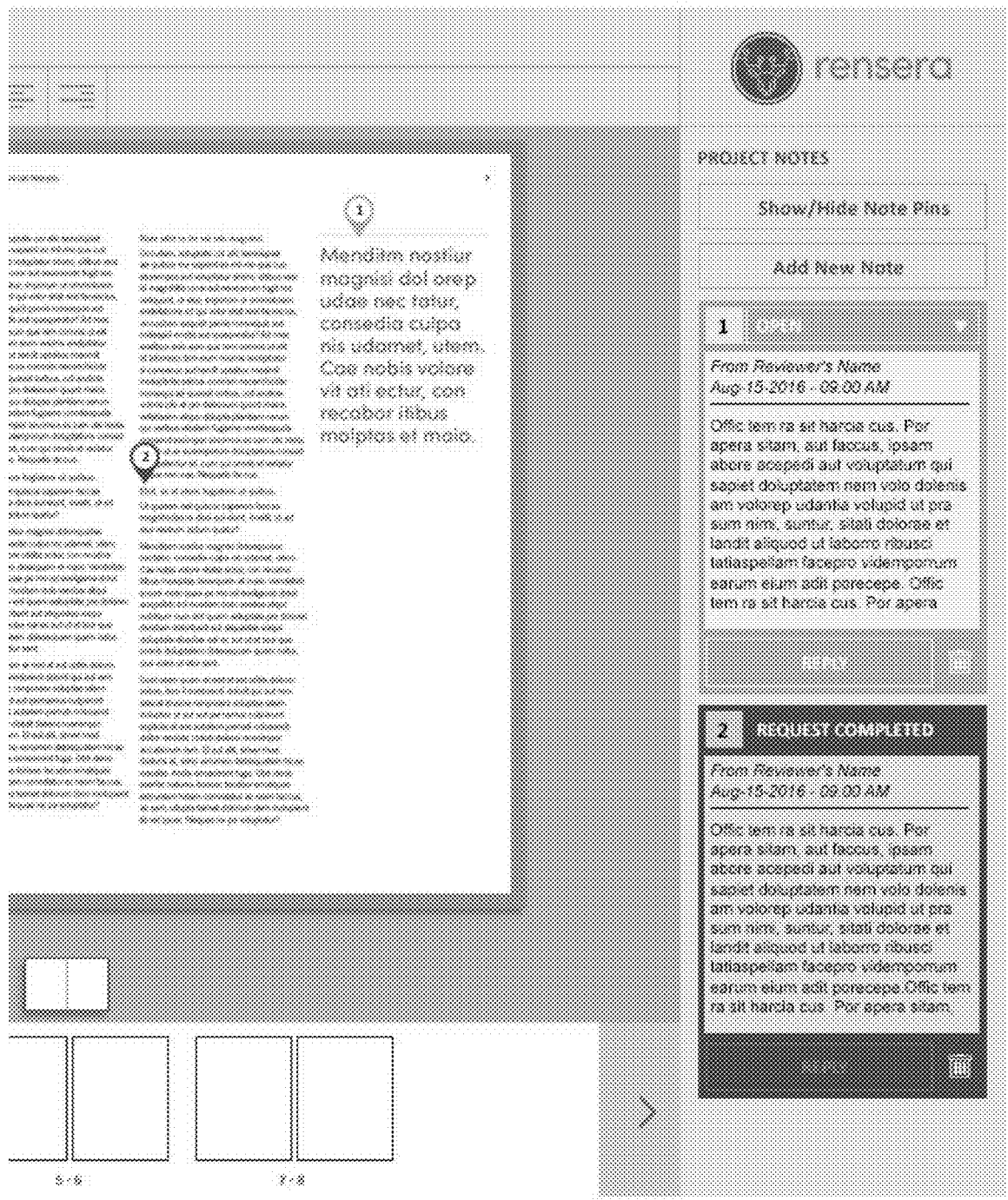
Figure 2Q:
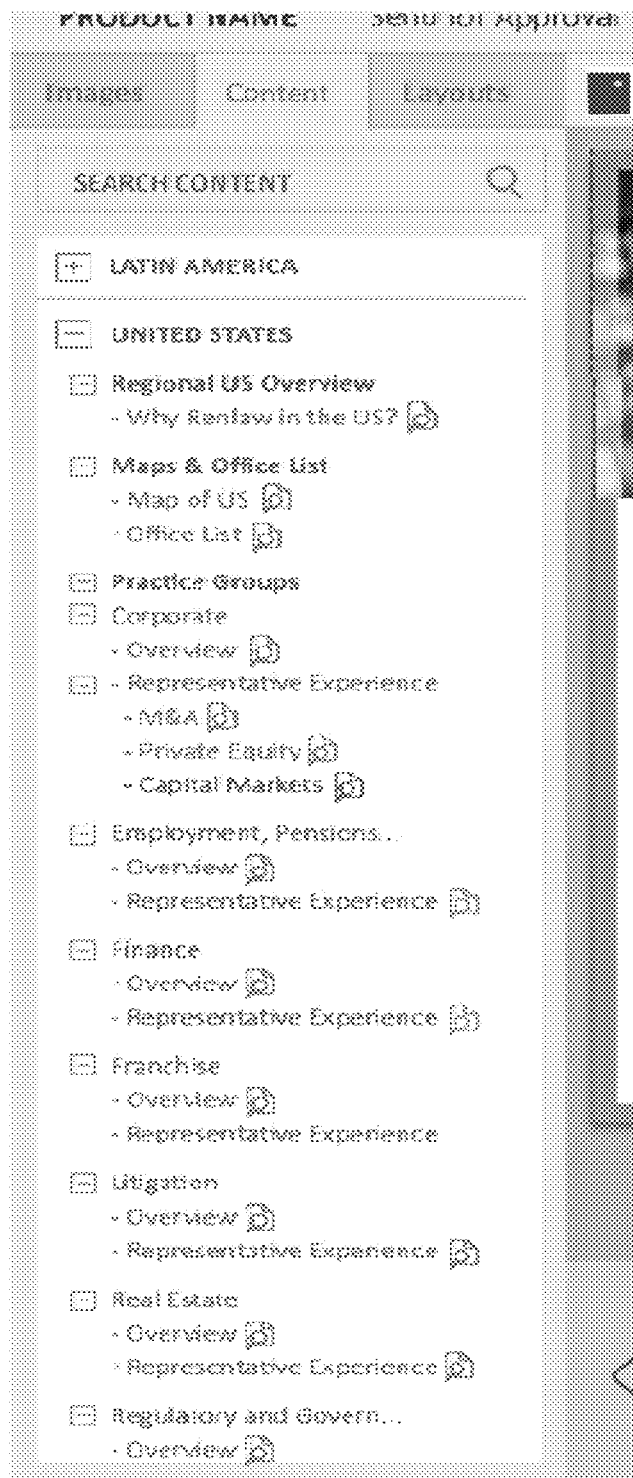
Figure 2R:
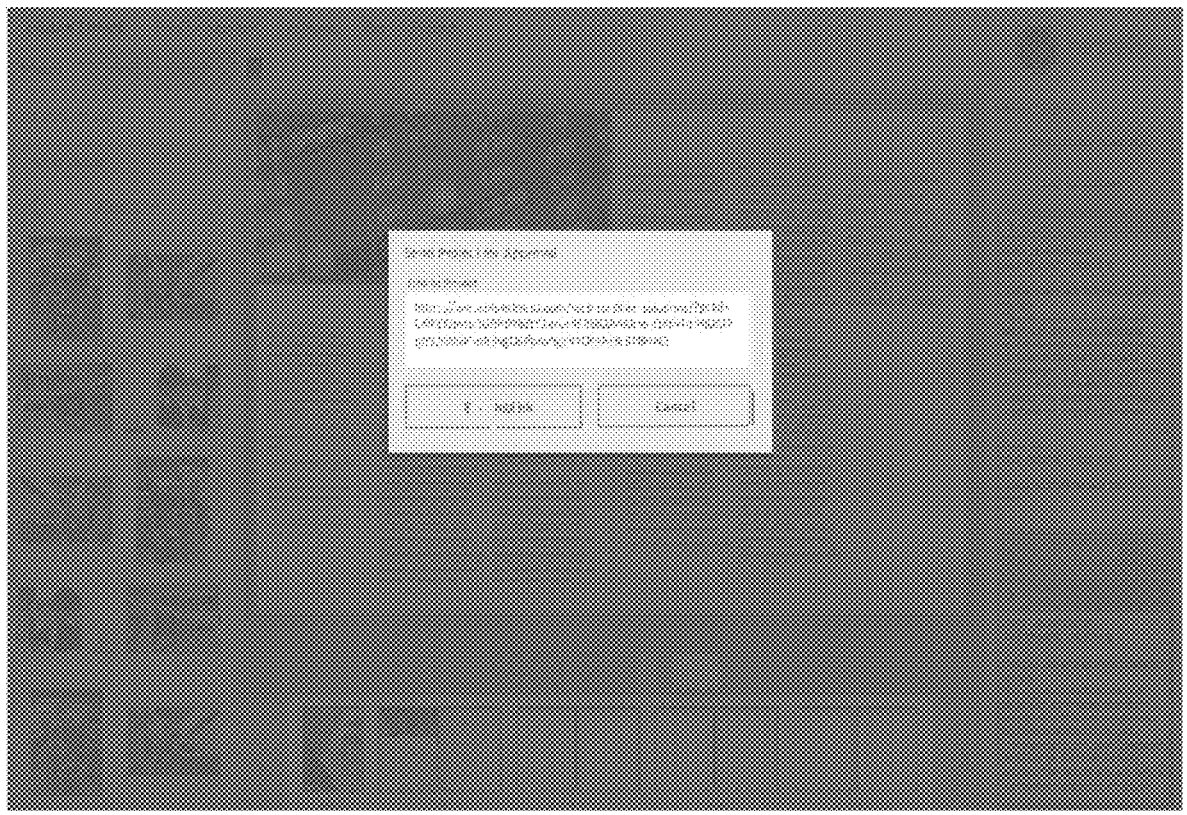
Figure 2S:
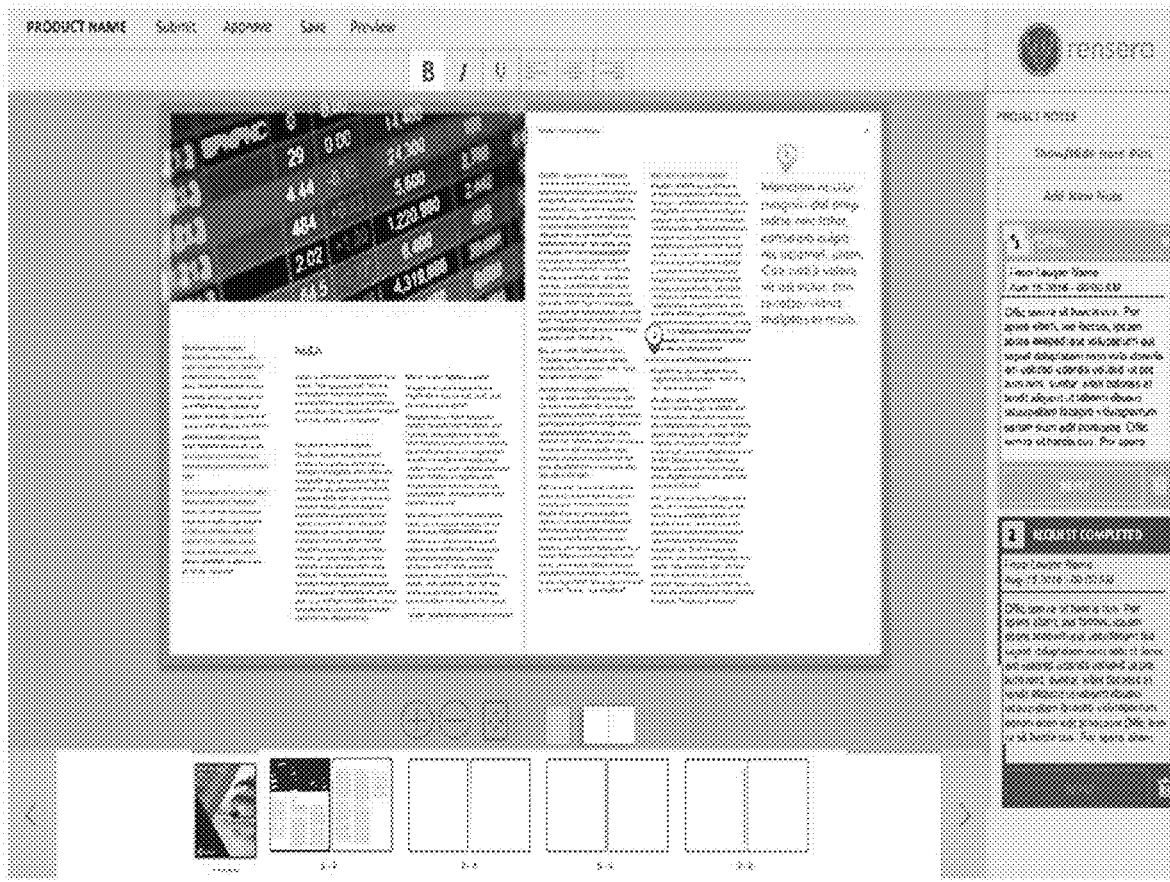
Figure 2T:
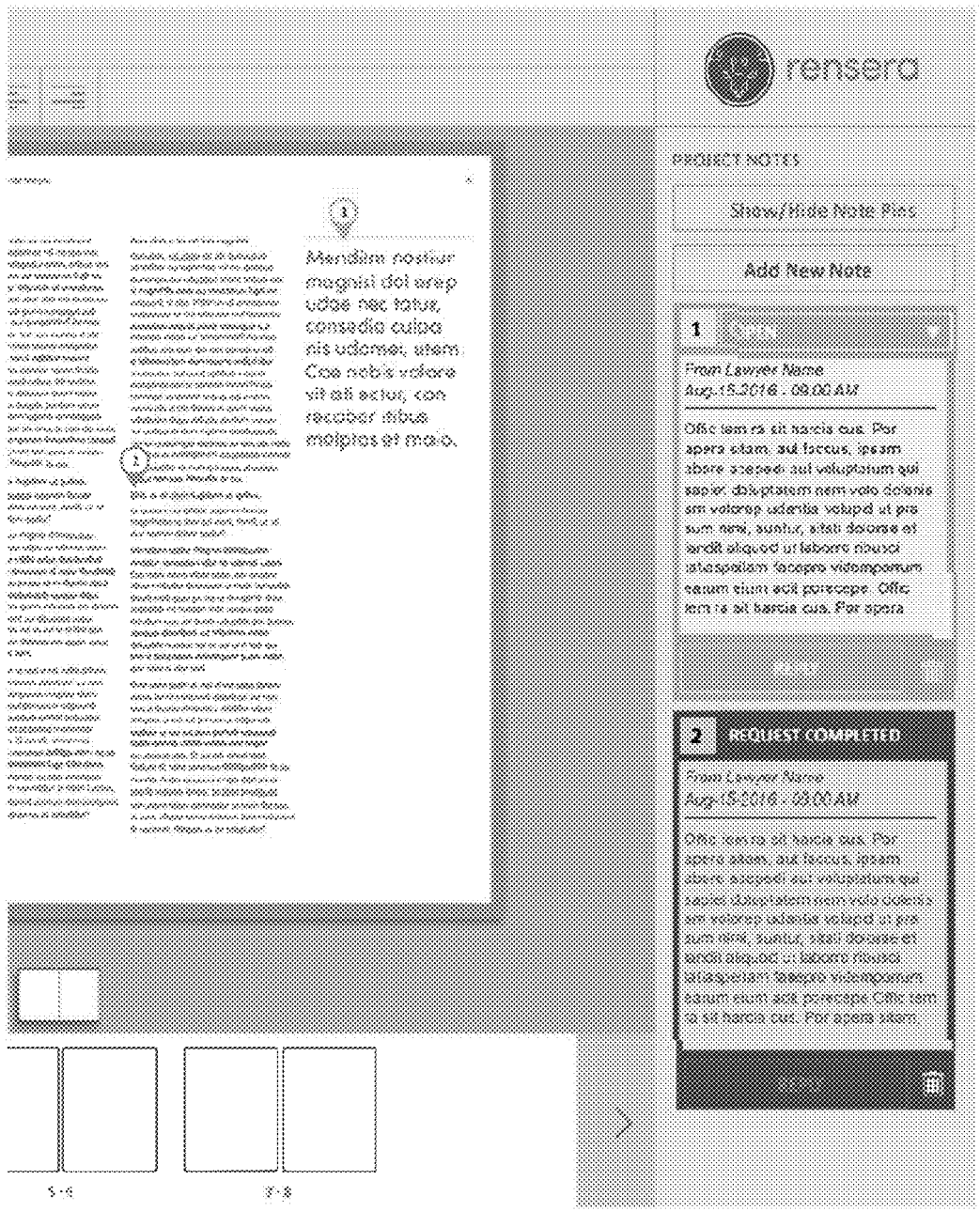

Now referring to FIG. 5, the present disclosure also discloses a method 500 for creating individualized bespoke print or electronic materials 118, as described in greater detail in FIGS. 2A through 2T. In some preferred embodiments, a user is directed to the dashboard (landing page) to create a new project. The dashboard displays the list of all projects related to the user's team. The user is able to filter the list of projects based on various criteria (e.g., projects for which the user is the Creator, status of project, date, etc.). From the dashboard, the user is able to view, create new, search, approve, archive, copy, edit or delete projects (depending on the user's role/security rights). Each project is displayed as a thumbnail with summary information and available options for each project (depending on the user's role/security rights).

The first step is for the user to enter metadata about the project such as document name, requestor, and other information that is used to tag the project for future searching and reporting 502. Some metadata is automatically recorded by the system (e.g., creation date, user's assigned team, creator, project status and last updated date (automatic date/time stamp)). The user is also able to capture additional details about the project, as needed, in a free text field. The user also selects the desired template for the project during this first step. A preview of each template is available.

Templates are created in InDesign and loaded into the system by the System Administrator. Users may have a virtually unlimited number of templates in the system. The user may click on View Template button to preview a template before selecting it.

In the second step, the user composes the project by selecting various pieces of content from the tree in the content panel to populate each section of the document 504. Users are able to search for a particular piece of content as well as preview the content before choosing to include it in the project. The content is filtered based on which section of the template the user is populating. The user drags and drops the desired content from the panel/tree into the appropriate section of the document. A preview of each piece of content is available. Once all desired content has been chosen, the user is able to review the list of chosen content and change the order of the content, if needed 506. The user may also preview the entire document before generating the project.

When ready, the user clicks on Generate Project, which then launches the document in the Project Editor, where the user may further customize the document 508.

Once a project is launched in the Project Editor, the user is able to make changes to the content, images, layout, etc. When a user selects an image object, the image editing controls will appear. For an existing image, the user may rotate, reposition and resize an image. A user may also search for (via category or key word) and select a new image to replace any existing image in the document. When a user hovers over a particular image in the image panel, a zoom preview of the image is displayed. To replace an image or insert a new image into an image object, the user drags and drops the new image into the document. The user is also able to change the layout of a particular page in the document. Available layouts are displayed on the layout panel. The user clicks on the desired layout in the list to change the layout of the page. The content and images are displayed based on the size and position of the content and image objects, respectively, of the new layout. A user may also import content by using the content panel in the Project Editor and drag and drop the content to the text boxes. A user can also preview the content by clicking on the magnifying glass icon. Within the Project Editor, the user may also add notes intended for the reviewer/approver to see. The user clicks within the object for which the note is needed and then clicks Add New Note. A pin with the corresponding note number appears within the document and the note text can then be entered by the user. All notes are automatically, sequentially numbered by the system.

At any time during the editing process, the marketing user may save the document to complete at a later time or preview the rendered document. The project is automatically saved to the user's dashboard and the status of the project is automatically updated by the system depending on the actions taken during the process.

Once all edits have been made and all notes added, the user clicks Send for Approval 510. The system will then generate a unique URL for the document that can then be emailed to the approver(s). When an approver clicks on the project link, the document is launched in the Approver Project Editor. The text editing capabilities are limited in the Approver Project Editor. If significant changes are needed, the approver is able to add a note for the marketing user by following the same steps noted above. Once the approver has reviewed and edited the document, he/she may Approve the document or click Submit to send the document back to the marketing user 512. Either action generates an automatic notification email that is sent to the marketing user. The marketing user is then able to relaunch the document in the Project Editor to view the approver's changes, see and respond to notes entered by the approver and make final changes, as needed 514.

Figure 3:
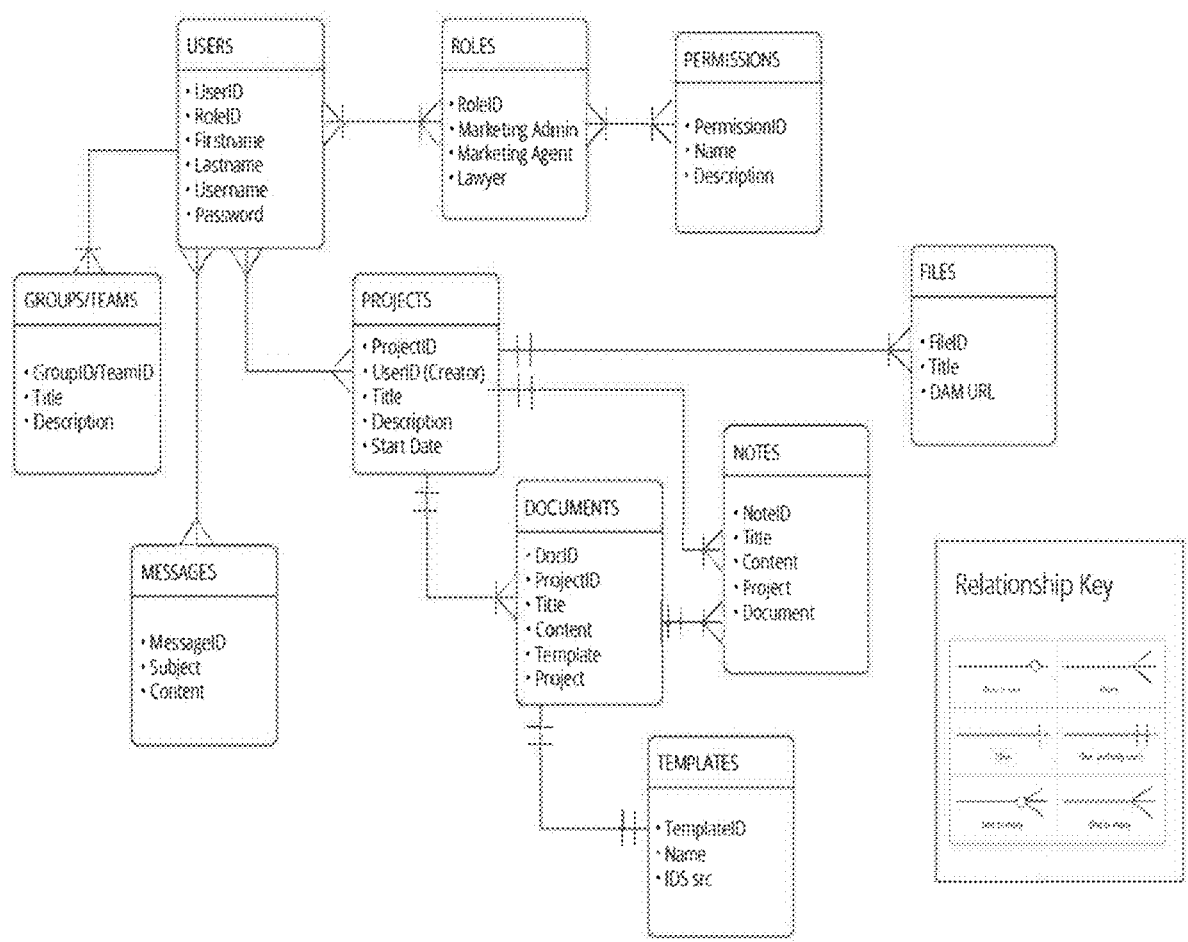

As depicted in FIG. 3, a primary function of the main processor 102 and/or main processor database is to store relational data for the application entities. In one embodiment of the application, the application entities are 1) Users, 2) Users Groups or Teams, 3) User Roles, 4) Messages, 5) Projects, 6) Project Notes, 7) Project Files, 8) Project Documents, 9) Permissions, and 10) Project Templates. In another embodiment, the application entities are 1) Users, 2) Users Groups or Teams, 3) User Roles, 4) Messages, 5) Projects, 6) Project Notes, 7) Project Files, and 8) Project Templates. In the latter embodiment, the Project entity is regarded as a working document. Database operations and procedures conform to accepted standards and include, but are not limited to, creating records in the database, reading records from the database, updating records in the database, and deleting records from the database.

Figure 4:
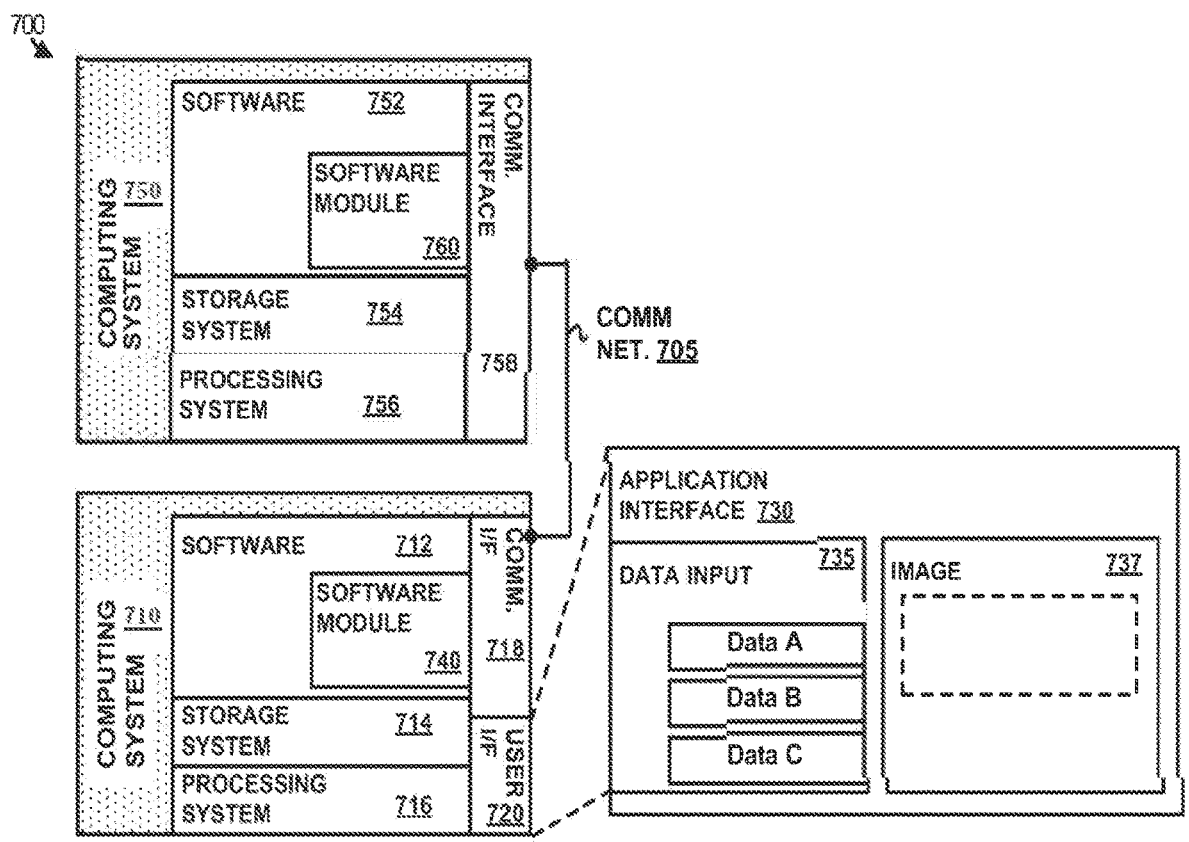

FIG. 4 illustrates a create-to-print document solution system 700 according to one embodiment. Computing environment 700 includes computing system 710 and computing system 750. Computing system 710, in the present example, corresponds to a main processor or user interface 102 that receives transmitted data and information, and computing system 750 corresponds to main server 104. Computing system 710 can include any smart phone, tablet computer, laptop computer, or other computing or mobile device capable of reading, and/or recording data. Computing system 750 can include any server computer, desktop computer, laptop computer, or other device capable of storing and managing the data collected by computing system 710 or other similar computing systems. Either system 710 or 750 can be capable of accomplishing any of the steps or functions described in this description.

In FIG. 4, computing system 710 includes processing system 716, storage system 714, software 712, communication interface 718, and user interface 720. Processing system 716 loads and executes software 712 from storage system 714, including software module 740. When executed by computing system 710, software module 740 directs processing system 716 to receive data, images, devices, locations, and/or equipment, etc. Such data could include any of the information described above, including but not limited to the functionality described in FIGS. 1-3.

Although computing system 710 includes one software module in the present example, it should be understood that one or more modules could provide the same operation. Similarly, the computing systems may be distributed using other computing systems and software.

Additionally, computing system 710 includes communication interface 718 that can be further configured to receive and/or transmit data and information to computing system 750 using communication network 705. Communication network 705 could include the Internet, cellular network, satellite network, RF communication, blue-tooth type communication, near field, or any other form of communication network capable of facilitating communication between computing systems 710 and 750. In some examples, communication interface 718 can further include a global positioning system to determine the location of computing system 710.

Referring still to FIG. 4, processing system 716 can comprise a microprocessor and other circuitry that retrieve and execute software 712 from storage system 714, which may, in some embodiments, be initially received from computing system 750. Processing system 716 can be implemented within a single processing device, but can also be distributed across multiple processing devices or sub-systems that cooperate in executing program instructions. Examples of processing system 716 include general purpose central processing units, application specific processors, and logic devices, as well as any other type of processing device, combinations of processing devices, or variations thereof. Storage system 714 can comprise any storage media readable by processing system 716, and capable of storing software 712. Storage system 714 can include volatile and nonvolatile, removable and non-removable media implemented in any method or technology for storage of information, such as computer readable instructions, data structures, program modules, or other data. Storage system 714 can be implemented as a single storage device, but may also be implemented across multiple storage devices or sub-systems. Storage system 714 can comprise additional elements, such as a controller, capable of communicating with processing system 716.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal. Although one software module is shown, the software may be distributed across many devices, storage media, etc.

User interface 720 can include a mouse, a keyboard, a camera, image capture, a voice input device, a touch input device for receiving a gesture from a user, a motion input device for detecting non-touch gestures and other motions by a user, and other comparable input devices and associated processing elements capable of receiving user input from a user. These input devices can be used for defining and receiving data about the locations, maps, systems, devices, and/or equipment, etc. Output devices such as a graphical display, speakers, printer, haptic devices, and other types of output devices may also be included in user interface 720. The aforementioned user input and output devices are well known in the art and need not be discussed at length here.

Application interface 730 can include data input 735 and image display 737. In one example, data input 735 can be used to collect information related to user specific created content, images, information, etc. It should be understood that although computing system 710 is shown as one system, the system can comprise one or more systems to collect data.

Computing system 750 includes processing system 756, storage system 754, software 752, and communication interface 758. Processing system 756 loads and executes software 752 from storage system 754, including software module 760. When executed by computing system 750, software module 760 directs processing system 710 to execute, store and manage the data from computing system 750 and other similar computing systems. Although computing system 750 includes one software module in the present example, it should be understood that one or more modules could provide the same operation.

Additionally, computing system 750 includes communication interface 758 that can be configured to transmit and/or receive data from computing system 710 using communication network 705.

Referring still to FIG. 4, processing system 756 can comprise a microprocessor and other circuitry that retrieve and execute software 752 from storage system 754. Processing system 756 can be implemented within a single processing device, but can also be distributed across multiple processing devices or sub-systems that cooperate in executing program instructions. Examples of processing system 756 include general purpose central processing units, application specific processors, and logic devices, as well as any other type of processing device, combinations of processing devices, or variations thereof.

Storage system 754 can comprise any storage media readable by processing system 756 capable of storing software. Storage system 754 can include volatile and nonvolatile, removable and non-removable media implemented in any method or technology for storage of information, such as computer readable instructions, data structures, program modules, or other data. Storage system 754 can be implemented as a single storage device, but may also be implemented across multiple storage devices or sub-systems. Storage system 754 can comprise additional elements, such as a controller, capable of communicating with processing system 756.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

In some examples, computing system 750 could include a user interface. The user interface can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a graphical display, speakers, printer, haptic devices, and other types of output devices may also be included in the user interface. The aforementioned user input and output devices are well known in the art and need not be discussed at length here. It should be understood that although computing system 750 is shown as one system, the system can comprise one or more systems to store and manage received data.

All directional references (e.g., top, bottom, front, back) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

The above-described benefits, embodiments, and/or characterizations are not necessarily complete or exhaustive, and in particular, as to the patentable subject matter disclosed herein. Other benefits, embodiments, and/or characterizations of the present invention are possible, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The above-described benefits, embodiments, and/or characterizations are not necessarily complete or exhaustive, and in particular, as to the patentable subject matter disclosed herein. Other benefits, embodiments, and/or characterizations of the present invention are possible.

What is claimed is:

1. A method of creating individualized bespoke material comprising:
   a. receiving transmitted server output data at a processor, wherein the server output data comprises customizable third-party data;
   b. receiving user input data at the processor, wherein the user input data comprises, at least in part, project metadata;
   c. integrating the server output data and user input data at the processor, wherein the customizable third-party data and project metadata are used, at least in part, to create project template data;
   d. customizing the project template data at a processor, wherein the project template data is used, at least in part, to create populated content data, wherein the populated content data comprises one or more pieces of content;
   e. filtering the populated content data at a processor, wherein the populated content data is used, at least in part, to create filtered populated content data, wherein the filtered populated content data is created, at least in part, based on which section of the template a user is populating; and
   f. generating individualized bespoke material at a processor, wherein the individualized bespoke material is created, at least in part, from the filtered populated content data.

2. The method of claim 1, wherein the customizable third-party data comprises data built on an Adobe InDesign CC Server platform.

3. The method of claim 2, wherein the Adobe InDesign CC Server platform integrates with a third-party web to print service that connects the Adobe InDesign CC Server with standard web browsers.

4. The method of claim 1, wherein the individualized bespoke material is in print form.

5. The method of claim 1, wherein the individualized bespoke material is in electronic form.

6. The method of claim 1, wherein the individualized bespoke material comprises hi-resolution PDFs.

7. The method of claim 1, wherein the user input data comprises content from multiple sources.

8. The method of claim 7, wherein the content from multiple sources is derived from at least one of a content management system or a document management system.

9. The method of claim 1, wherein the project template data can integrate with digital asset management systems thereby allowing a user access to assets such as images and logos using drag and drop functionality.

10. The method of claim 1, further comprising an automated workflow that guides a user throughout the entire life cycle of a project, from the initial document development, through the editing process with the project requester, to the approval, rendering and eventual archiving of the final product.

11. The method of claim 1, wherein the project metadata includes at least one of
   a. document name;
   b. requestor;
   c. creation date;
   d. user's assigned team;
   e. creator;
   f. project status;
   g. last updated date; or
   h. other information used to tag the project for future searching or reporting.

12. The method of claim 1, wherein the project metadata can be used to search, filter or report on projects.

13. The method of claim 1, wherein the project metadata gives a user access to customizable input fields that allow system adaption and individualized project tracking, further comprising at least one of geographic locations, service areas, or other identifying data.

14. The method of claim 1, wherein the individualized bespoke material is created without needing additional internal or external graphic design resources.

15. A system for creating individual bespoke material, comprising:
   a. one main processor configured to:
      i. receive transmitted server output data, wherein the server output data comprises customizable third-party data;
      ii. receive user input data, wherein the user input data comprises, at least in part, project metadata;
      iii. integrate the server output data and user input data, wherein the customizable third-party data and project metadata are used, at least in part, to create project template data;
      iv. customize the project template data, wherein the project template data is used, at least in part, to create populated content data, wherein the populated content data comprises one or more pieces of content;
      v. filter the populated content data, wherein the populated content data is used, at least in part, to create filtered populated content data, wherein the filtered populated content data is created, at least in part, based on which section of the template a user is populating; and
      vi. generate individualized bespoke material, wherein the individualized bespoke material is created, at least in part, from the filtered populated content data.

16. The system of claim 15, further comprising at least one additional main processor to collect data.

17. The system of claim 16, wherein the main processor stores relational data comprising
   a. Users;
   b. Users Groups or Teams;
   c. User Roles;
   d. Messages;
   e. Projects;
   f. Project Notes;
   g. Project Files;
   h. Project Documents;
   i. Permissions; and
   j. Project Templates.

18. The system of claim 16, wherein the main processor stores relational data comprising
   a. Users;
   b. Users Groups or Teams;
   c. User Roles;
   d. Messages;
   e. Projects;
   f. Project Notes;
   g. Project Files; and
   h. Project Templates.

19. A non-volatile computer readable medium with instructions stored thereon which, if executed by a processor, causes the processor to:
   a. receive transmitted server output data, wherein the server output data comprises customizable third-party data;
   b. receive user input data, wherein the user input data comprises, at least in part, project metadata;
   c. integrate the server output data and user input data, wherein the customizable third-party data and project metadata are used, at least in part, to create project template data;
   d. customize the project template data, wherein the project template data is used, at least in part, to create populated content data, wherein the populated content data comprises one or more pieces of content;
   e. filter the populated content data, wherein the populated content data is used, at least in part, to create filtered populated content data, wherein the filtered populated content data is created, at least in part, based on which section of the template a user is populating; and
   f. generate individualized bespoke print material, wherein the individualized bespoke print material is created, at least in part, from the filtered populated content data.

20. The non-volatile computer readable medium of claim 19, further comprising a create-to-print document solution.

* * * * *